United States Patent [19]
Martin et al.

[11] 3,734,239
[45] May 22, 1973

[54] SELF STORING VEHICLE LOADING PLATFORM

[75] Inventors: Paul H. Martin, Toronto, Ontario; William C. McKee, Willowdale, Ontario, both of Canada

[73] Assignee: Diesel Equipment Limited, Leaside, Ontario, Canada

[22] Filed: Dec. 1, 1971

[21] Appl. No.: 203,787

[52] U.S. Cl. ............................ 187/9, 214/75 T
[51] Int. Cl. ............................ B60p 1/44
[58] Field of Search .................. 187/9; 214/75 T, 214/77 P; 296/61, 55; 14/71, 72

[56] References Cited

UNITED STATES PATENTS

| | | | |
|---|---|---|---|
| 3,675,739 | 7/1972 | Erlinder | 214/75 T |
| 2,530,341 | 11/1950 | Satsky | 214/75 T |
| 3,035,720 | 5/1962 | Selzer | 214/75 T |
| 3,352,440 | 11/1967 | Wilson | 214/85 |
| 2,718,431 | 9/1955 | Pietroroia | 214/85 |

*Primary Examiner*—Gerald M. Forlenza
*Assistant Examiner*—Lawrence J. Oresky
*Attorney*—Roy H. Saffrey

[57] ABSTRACT

A powered tailgate for a vehicle, the tailgate being of the type that can be raised and lowered when it is in either a horizontal plane or a vertical plane and being formed of two parts connected together along a horizontal hinge line so that the two parts may be folded together for compact storage when the tailgate is not required. It includes several locking devices for bracing the tailgate when the two parts are in alignment, and for holding the two parts together and tight against the vehicle when the tailgate is in the folded condition.

8 Claims, 6 Drawing Figures

Patented May 22, 1973

3,734,239

4 Sheets-Sheet 4

SELF STORING VEHICLE LOADING PLATFORM

This invention relates to powered tailgates for vehicles and is particularly concerned with an improved tailgate of the type in which the tailgate platform can be raised and lowered while in either a vertical or horizontal plane.

In U.S. Pat. No. 3,275,170, dated Sept. 27, 1966, and Canadian Pat. No. 774,964, dated Jan. 2, 1968, there is described and claimed a hydraulic loading device having particular application as a powered tailgate and characterized by the feature that the tailgate platform could be raised and lowered while in either a vertical or horizontal plane. The chief advantage of this arrangement is that a vehicle equipped with such a tailgate can be backed close to a warehouse door, for example, by lowering the platform while holding it in a vertical plane.

The improvement of this invention consists of making the platform of two parts which are hinged together in such a way that the platform may be folded upon itself for compact storage while driving the vehicle in the open rear end configuration convenient for transporting excessively long loads or other loads where a closed tailgate is not required or desired.

In accordance with the present invention an improved powered tailgate of the type in which the tailgate platform can be raised or lowered while in either the horizontal or vertical plane includes a platform formed of two parts hinged together along a horizontal hinge line so that one part can be folded upon the other, and further includes means for locking the two parts together and means for locking the platform part to the vehicle body when folded.

The invention will be more clearly understood from the following description of an embodiment thereof as read in conjunction with the accompanying drawings.

Figure 1:
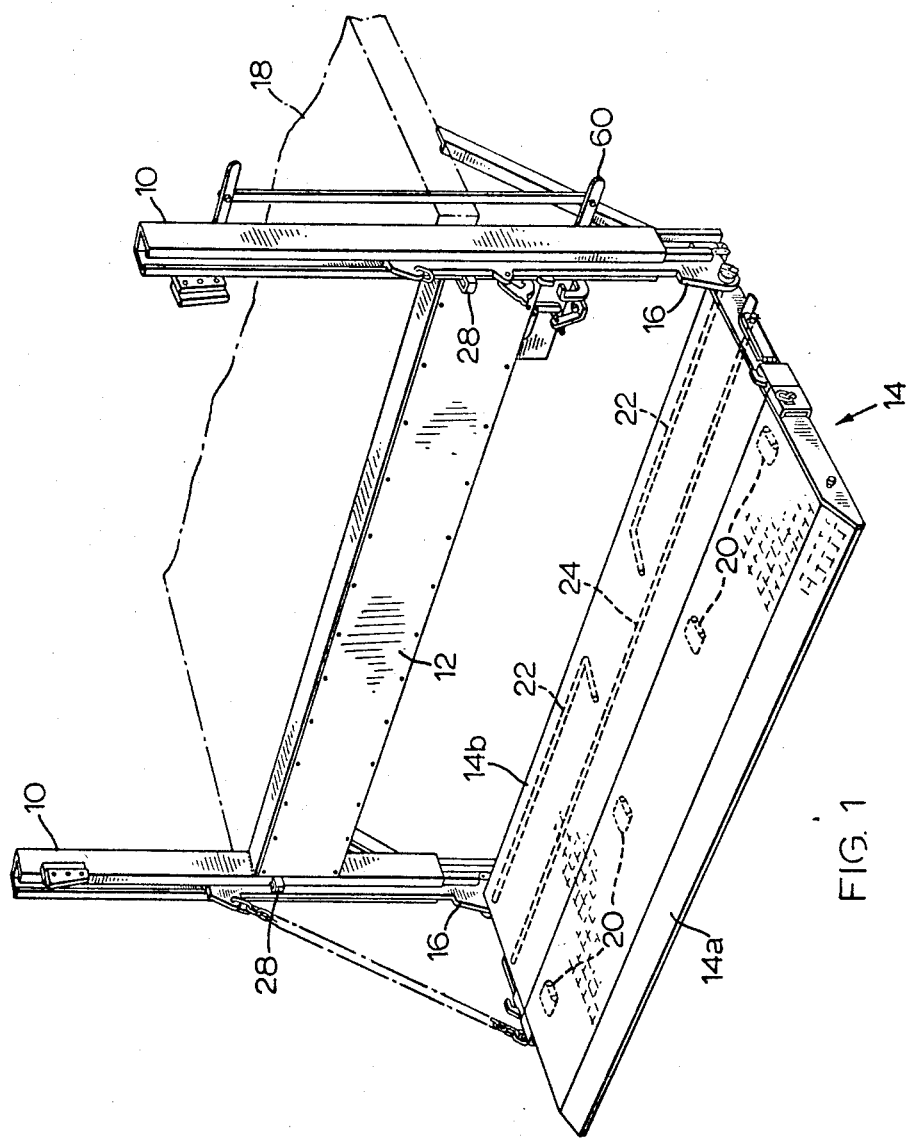
FIG. 1 is a perspective view of this preferred embodiment of the invention as shown affixed to the floor of a vehicle body shown in dot and dash lines.

The tailgate shown in FIG. 1 has the same general configuration of the tailgates illustrated in the earlier aforementioned Canadian and United States patents. No details of the hydraulic-mechanical system for raising and lowering the tailgate are given as these are identical to those employed in the basic tailgate and can be seen in the earlier patents.

The chief components of the tailgate are a pair of slotted corner posts 10, a transversely extending box member 12 containing the hydraulic-mechanical system for raising and lowering the tailgate, the tailgate platform itself 14, which is pivotally connected at either side to a pair of slide elements 16 received within posts 10. Platform 14, being pivoted to slide elements 16, can be rotated from the horizontal plane position illustrated in FIG. 1 to a vertical plane position. While the platform is in either of these two positions or any intermediate position, it can be raised and lowered by the ram of a hydraulic-mechanical system contained within box 12 which actuates the slides 16.

From FIG. 1 it can be understood that if platform 14 were pivoted upwardly, its outer edge would come to rest about the level of the floor of the truck body 18. Before driving the truck with the platform in the vertical position it must be raised so that the lower edge is at about the level of the truck body, in which position it is mechanically secured to the truck body as distinct from hydraulically secured. It will be apparent that if one has need to use the truck without need for the power loading one must operate the gate up and down each time access to the truck body is desired. It is an object of this invention to provide a power loading structure which can be folded out of the way when it is not required for loading or unloading and of providing simple mechanical arrangements for doing this.

This is accomplished by forming platform 14 in two parts which, for descriptive purposes, are designated as an outer part 14a and an inner part 14b. These two parts are hinged together along a horizontal hinge line by means of four spaced hinges 20, which are shown in dotted lines in FIG. 1. Also shown in dotted lines in FIG. 1 are a pair of torsion bars 22, which assist the operator in pivoting the platform from the illustrated horizontal position to the vertical position, and a transverse rod 24, the function of which is described hereinafter.

Figure 2:
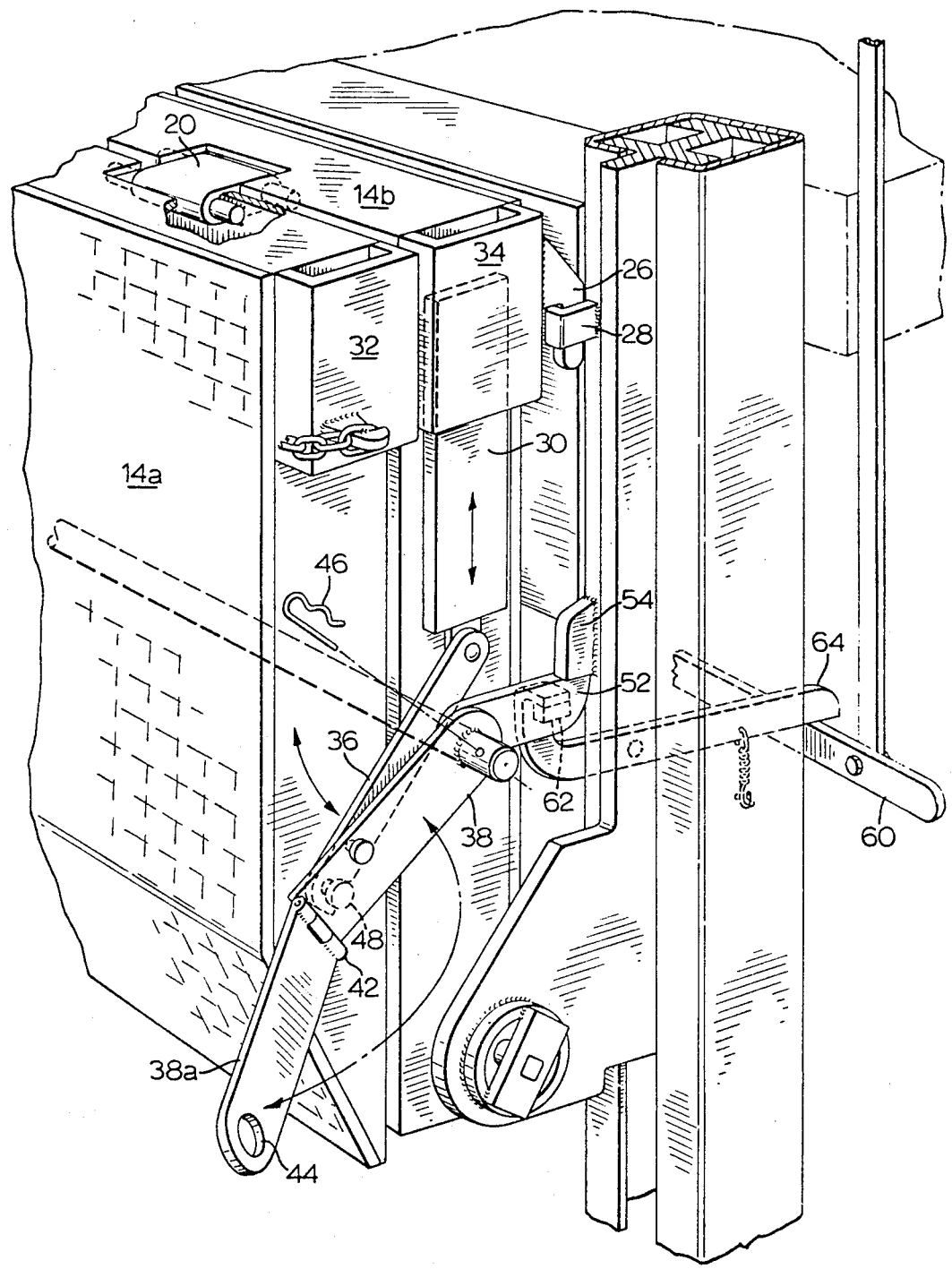
FIG. 2 is a perspective view partly broken away, of the tailgate shown in FIG. 1 in its folded condition.

In FIG. 2 the tailgate is shown in its fully folded position with inner part 14b having been pivoted upwardly about its pivoted connection to slides 16 and outer part 14a having been pivoted about hinges 20 to lie parallel to and outside of inner part 14b.

In the fully folded position, part 14b is mechanically locked to the post 10 and hence to the vehicle body by means of a pair of hooks 26 (one on either side of the platform) engaged in U-shaped brackets 28 welded to posts. It will be appreciated that in order to engage hooks 26 within brackets 28 it is essential that when the platform is pivoted upwardly into the vertical plane, these hooks are positioned above the brackets so that subsequent lowering of the platform (while holding the platform in the vertical plane) will cause the hooks to drop into the brackets. It is preferable that inner part 14b be firmly locked to the posts by means of hooks 26 engaging in brackets 28 before outer part 14a is pivoted downwardly.

Figure 3:
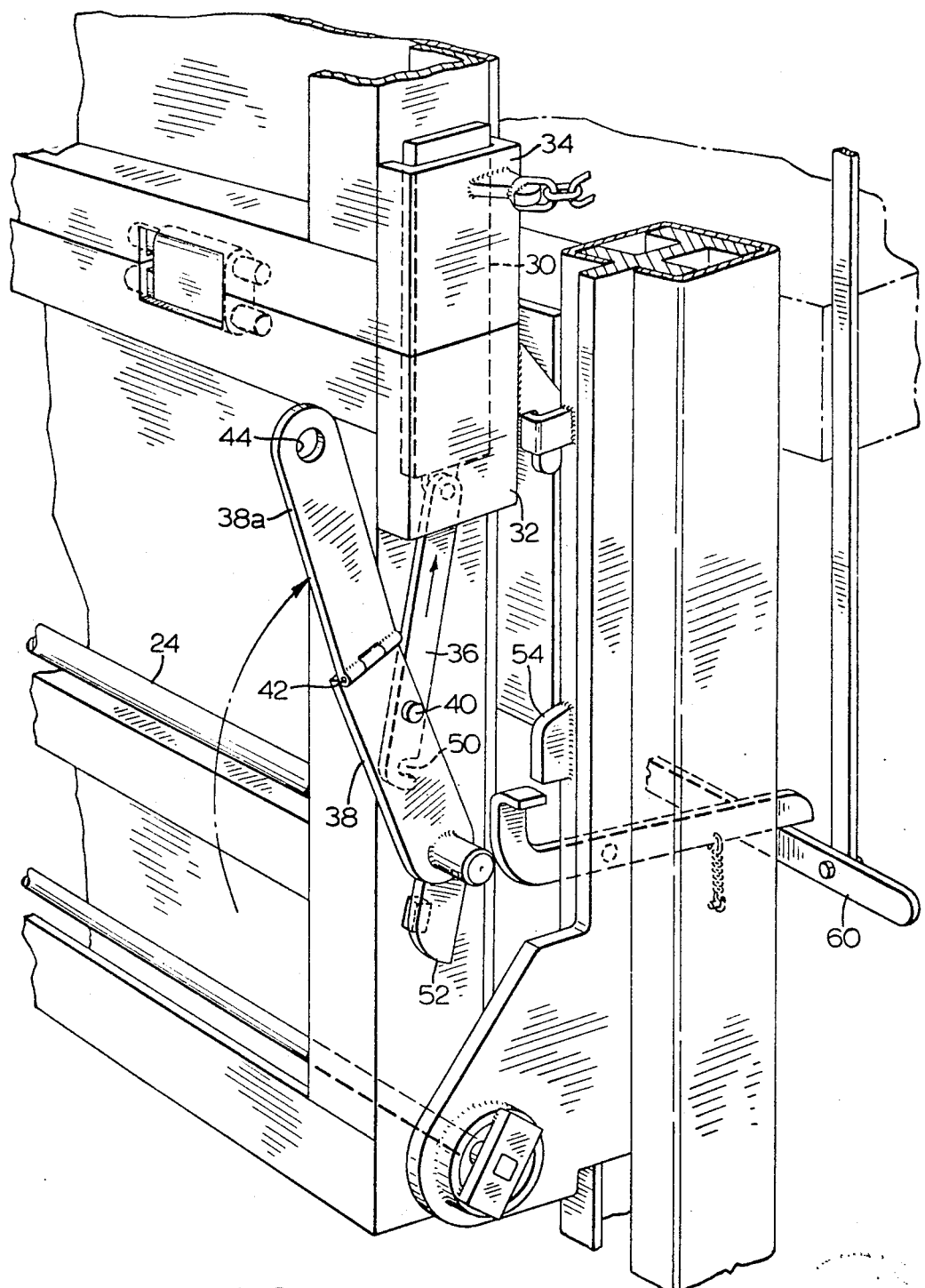
FIG. 3 is a view similar to FIG. 2 but showing an intermediate stage in changing the tailgate from the fully folded position of FIG. 2 to the unfolded position shown in FIG. 1.

Before pivoting outer part 14a about hinges 20 into the position shown in FIG. 2, it is necessary to lower two locking bars 30, one on either side of the platform. This procedure can best be understood by referring to FIG. 3. While this figure is primarily intended to illustrate a particular stage in the unfolding of the two platform parts, it also serves to illustrate the equivalent stage in the folding of the platform. As can be seen in FIG. 3, locking bars 30 are received within channel members 32 and 34 so that the two platform parts are rigidly locked together and folding of outer platform part 14a upon the other part first requires lowering of the locking bar 30 until it is free of the channel member 34. This is accomplished by means of a pair of interconnected levers 36 and 38. The narrow lever 36 is pivotally connected to the lower end of locking bar 30 and to wide lever 38 at pin 40. The latter lever is a hinged two-part member adapted to fold upon itself about a hinge 42 so that the outer part 38a may, in effect, be stored while the platform is in either its folded condition or its extended condition. A hole 44 engages the outer end of transverse rod 24 and is locked in position by a spring clip 46. (see FIG. 2).

Lever 38 is rigidly fixed to the outer end of transverse rod 24 so that the manipulation of this lever rotates rod 24 to also manipulate a lever arrangement on the opposite side of the platform for moving the second locking bar 30 on that side of the platform and which is engaged in channel members equivalent to members 32 and 34. As a means of locking the two platform parts together when in the folded position, a headed stud 48, shown in dotted lines in FIG. 2, is fixed to the side edge of outer platform part 14a and is engaged in a notch 50 in the outer end of narrow lever 36.

As previously explained, the platform when in the folded condition is locked to the vehicle body by the hooks 26 and brackets 28. As a safety measure to prevent inadvertent disengagement of the hooks in the brackets, the outer end of transverse rod 24 carries a rigidly attached third lever 52 which, upon rotation of the rod 24 swings under a stop member 54 fixed to post 10. Lever 52 in conjunction with lever 64 is also used to render inoperative the hydraulic system which raises the tailgate. As previously mentioned, a hydraulic-mechanical system is enclosed within box 12 and is connected to the slides 16 through a chain and sprocket system to lift and lower the platform as described in U.S. Pat. No. 3,275,170. A lever 60 positioned adjacent one of the posts 10 controls the operation of this hydraulic-mechanical system and is so arranged that when the truck driver raises lever 16, the platform is raised. It will be appreciated, however, that should this lever 60 be raised when the platform is in the fully folded position, the hydraulic-mechanical system would attempt to raise the platform when the platform is effectively locked against being raised by virtue of the engagement of lever 52 with stop member 54. Thus, it is essential, that when lever 52 bears against stop member 54 to prevent raising of the platform, means must also be provided to prevent the driver from lifting lever 60. This is accomplished by means of the small block member 62 carried by lever 52, which is positioned under a hook carried at one end of a pivoted safety link 64 when lever 52 is in engagement with stop member 54. The opposite end of link 64 rests on top of lever 60, and from FIG. 2 it can be seen that it is impossible to raise lever 60 when the platform is in the fully folded and locked position.

To unlock and unfold the platform the following procedure is followed. First, spring clip 46 is removed from the outer end of transverse shaft 24 so that the outer part 38a of lever 38 may be pivoted on hinge 42 so that lever 38 is in the fully extended position. Then, lever 38 is swung upwardly, the first result being that the notched outer end of lever 36 is released from its engagement on headed stud 48. This releases the outer part 14a of the platform so that it may be swung upwardly and come to rest in a vertical plane as shown in FIG. 3. When this has been done lever 38 is rotated upwardly further to move locking bars 30 into brackets 34 as to firmly lock the two platform parts in alignment. The final position of lever 38 is shown in FIG. 1, from which it can be seen that this lever is also aligned with brackets 32 and 34. Finally, the outer part 38a of lever 38 is again folded downwardly and engaged on the outer end of rod 24, and spring clip or pin 46 is put back in place.

It will be noted that the rotation of lever 38 as above described also swings lever 52 out of engagement with stop member 54 and also moves block 62 from its position beneath the hook outer end of safety link 64. Thus, all the various locking and safety devices are released so that the platform can now be raised by the driver by the usual method of raising lever 60, and if it is desired to move the platform into the horizontal plane shown in FIG. 1, the first essential step is to raise the platform somewhat so as to release hooks 26 from their engagement in brackets 28.

Figure 4:
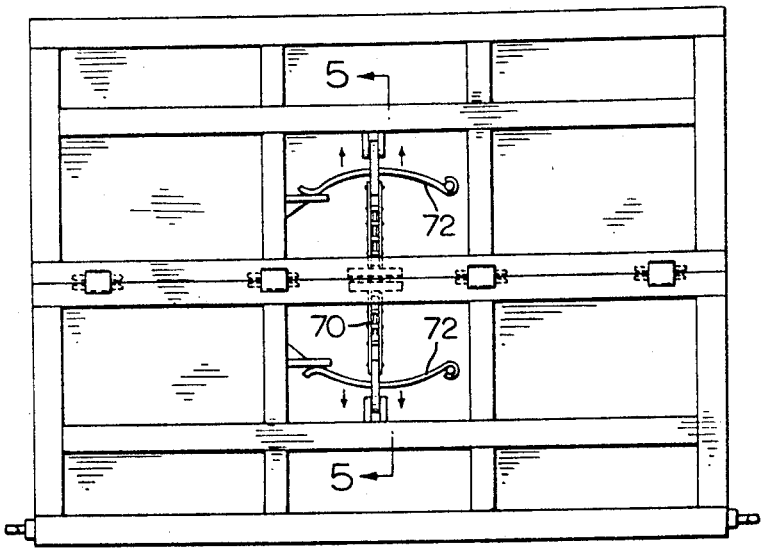
FIG. 4 is a plan view of the underside of the tailgate platform in the unfolded position.
Figure 5:
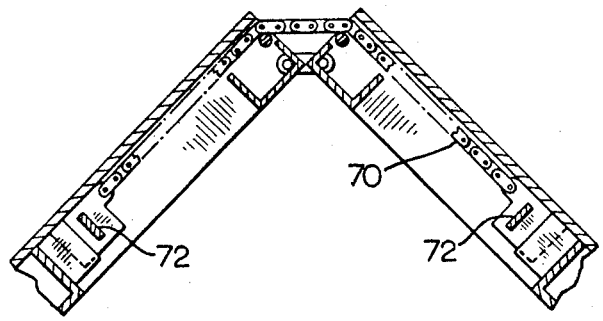
FIG. 5 is a cross sectional view taken along the line 5—5 of FIG. 4 but showing the platform in a partially folded configuration.
Figure 6:
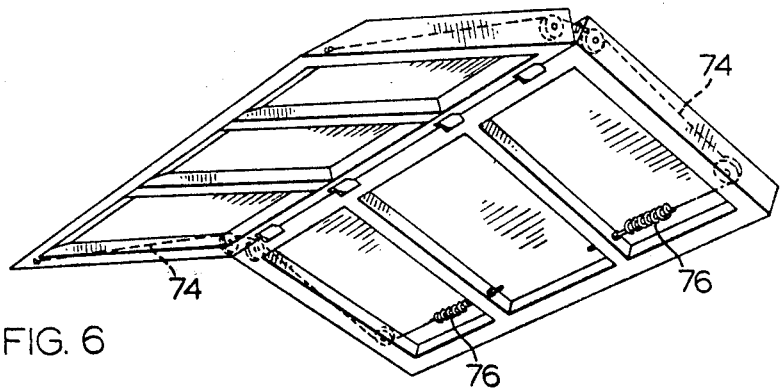
FIG. 6 is a perspective view of a modified form of platform shown in a partly folded position.

It will be appreciated that in the case of the larger powered tailgates employed on heavy duty vehicles the platform is a fairly heavy mass. In some cases, therefore, it is necessary to spring bias the two platform parts so that the driver can lift the outer part 14a from the fully overlapped position shown in FIG. 2 to the vertical position shown in FIG. 3. Two alternative arrangements for providing such spring bias are illustrated in FIGS. 4, 5 and 6. In FIGS. 4 and 5 the two platform parts are inter-connected by a chain 70 which pulls against two leaf springs 72 when the platform is being folded so that when the driver wants to unfold the platform, the bias built up in these leaf springs tends to assist the driver, at least when the driver has lifted the outer platform part a sufficient distance that the relative angle between the parts shown in FIG. 5 is exceeded. An alternative system is shown in FIG. 6. Here a pair of cables 74 exert bias in coil springs 76 when the platform is folded, which bias is later used to assist in the unfolding operation.

The foregoing description presents one specific embodiment of the invention, but it should be understood that modifications are possible without departing from the scope of the invention.

What we claim as our invention is:

1. In a powered tailgate for a truck body of the type in which the tailgate platform is pivoted at its inner edge to vertically oriented slide members, the slide members being rigidly mounted on the truck body whereby the tailgate can be raised and lowered to and from a raised position in which the inner edge is at the same level as the floor of the truck body, while in either a horizontal or vertical plane, and which has mechanical locking means for locking the tailgate in the raised position, the improvement which comprises a platform which has an inner part and an outer part which are hinged together along a horizontal hinge line whereby the gate may be folded upon itself for compact storage when operating the vehicle which carries the tailgate in circumstances which do not require the tailgate function, first locking means for locking said platform parts to hold them in alignment when unfolded, and second locking means for locking the platform parts together and to the vehicle body when folded and in a storage position in which both the inner and outer parts are no higher than the level of the floor of the truck body, said means for releasably holding said platform parts in alignment when unfolded including a pair of slidable locking bars, one on either side of the platform, said locking bars being received on channel members fixed to the inner and outer platform parts, and means for sliding said bars in and out of the channel members fixed to the outer platform part whereby said platform parts may be locked in alignment or released for folding respectively, said means for sliding said bars consisting of a manually operated lever system including a rotatably cross bar extending from one side of the platform to the other on the underside of the inner platform part, a pair of first levers fixed at one end to the ends of said cross bar, a pair of second levers pivotally attached at one end to said first levers and to one end of said bars at their other ends, one of said first levers having a handle-like extension whereby said first levers may be rotated to cause said second levers to exert a force on said bars which will cause said bars to slide within said channel members.

2. A powered tailgate as claimed in claim 1, in which said lever system includes a fifth lever fixed at one end to one end of said cross bar, and further including a stop member fixed to said vehicle and positioned so that the outer free end of said fifth lever bears against the underside of said stop member when said platform is folded to thereby prevent said folded platform from inadvertent upward movement which might release said hooks from said hook receiving brackets.

3. A powered tailgate as claimed in claim 2, further including spring means carried by said platform for easing the manual effort required to unfold said platform parts.

4. In a powered tailgate for a truck body of the type in which the tailgate platform is pivoted at its inner edge to vertically oriented slide members, the slide members being rigidly mounted on the truck body whereby the tailgate can be raised and lowered to and from a raised position in which the inner edge is at the same level as the floor of the truck body, and which has mechanical locking means for locking the tailgate in the raised position, the improvement which comprises a platform which has an inner part and an outer part which are hinged together along a horizontal hinge line whereby the gate may be folded upon itself for compact storage when operating the vehicle which carries the tailgate in circumstances which do not require the tailgate function, and including means for locking the platform with respect to the vehicle body to prevent further lowering or raising of said platform when folded and in a storage position in which both the inner and outer parts are no higher than the level of the floor of the truck body.

5. A powered tailgate as claimed in claim 4, in which said locking means consists of releasable hook and bracket assemblies for holding the inner part of the platform to the vehicle body and a releasable latch for holding the outer platform part to the inner platform part.

6. A powered tailgate as claimed in claim 5, in which said hook and bracket assemblies each comprise a hook attached to one side of the inner platform part and a hook receiving bracket fixed to the vehicle, said bracket being oriented to receive the hook when said inner platform part is lowered while in the vertical plane.

7. A powered tailgate as claimed in claim 4 wherein said inner platform portion has an outer edge and said outer platform has an inner edge which are substantially level with one another and with the floor of said truck when said platform is in the locked storage position.

8. A powered tailgate as claimed in claim 7, wherein outer edge of said inner part and said inner edge of said outer part are flat and provide an extension of the truck floor for supporting a load during passage of a load to and from the truck when the platform is in the storage position.

* * * * *